US010437337B2

(12) United States Patent
Park (10) Patent No.: US 10,437,337 B2
(45) Date of Patent: Oct. 8, 2019

(54) WEARABLE HAPTIC PATTERN DISPLAY DEVICE FOR BLIND PERSON

(71) Applicant: LYNTZ CO., LTD., Gangnam-gu, Seoul (KR)

(72) Inventor: Dong Hyun Park, Seoul (KR)

(73) Assignee: LYNTZ CO., LTD., Gangnam-gu, Seoul (KR)

( * ) Notice: Subject to any disclaimer, the term of this patent is extended or adjusted under 35 U.S.C. 154(b) by 97 days.

(21) Appl. No.: 15/746,534

(22) PCT Filed: Jul. 20, 2016

(86) PCT No.: PCT/KR2016/007875
§ 371 (c)(1),
(2) Date: Jan. 22, 2018

(87) PCT Pub. No.: WO2017/014542
PCT Pub. Date: Jan. 26, 2017

(65) Prior Publication Data
US 2018/0217667 A1    Aug. 2, 2018

(30) Foreign Application Priority Data

Jul. 23, 2015    (KR) .................. 10-2015-0104465

(51) Int. Cl.
*G06F 3/01*    (2006.01)
*G06F 3/041*    (2006.01)
(Continued)

(52) U.S. Cl.
CPC .............. *G06F 3/016* (2013.01); *G06F 1/163* (2013.01); *G06F 3/014* (2013.01); *G06F 3/0416* (2013.01); *H04M 1/72594* (2013.01)

(58) Field of Classification Search
CPC ...................................................... G06F 3/01
See application file for complete search history.

(56) References Cited

U.S. PATENT DOCUMENTS

2016/0018890 A1*  1/2016  Deokar et al. ............ G06F 3/01
2016/0314708 A1* 10/2016  Cohain et al. ......... G09B 21/00

FOREIGN PATENT DOCUMENTS

JP            5543615 B2    7/2014
KR    10-2009-0036741 A    4/2009
(Continued)

OTHER PUBLICATIONS

International Search Report and Written Opinion dated Nov. 7, 2016, issued in corresponding International Application No. PCT/KR2016/007875, filed Jul. 20, 2016, 9 pages.

*Primary Examiner* — James J Debrow
(74) *Attorney, Agent, or Firm* — Christensen O'Connor Johnson Kindness PLLC (57) ABSTRACT

The present disclosure relates to a wearable haptic pattern display device for a blind person, and more particularly, to a wearable haptic pattern display device for a blind person, which has a compact size to make it easy for a user to carry the display device, includes a touch screen installed on the front surface of a main body thereof and having a touch panel and electro-sensitive panel integrated and coupled to each other in order to provide a text screen composed of various combinations of haptic textures through the touch screen, includes a ring-shaped wearing member installed on the rear surface of the main body thereof such that a user can conveniently read a text screen composed of haptic textures displayed on the touch screen using his thumb with the ring-shaped wearing member worn around his index finger, and thus read characters of news, books or messages using the display device regardless of time and location, includes an NFC module installed in the main body thereof and configured to receive guide information from NFC tags installed at various places such as roads, intersections, stores (Continued)

or existing braille signs, such that blind users can effectively use the guide information.

19 Claims, 5 Drawing Sheets

(51) Int. Cl.
*G06F 1/16* (2006.01)
*H04M 1/725* (2006.01)

(56) References Cited

FOREIGN PATENT DOCUMENTS

| | | | |
|---|---|---|---|
| KR | 10-2009-0074325 | A | 7/2009 |
| KR | 10-1181811 | B1 | 9/2012 |
| KR | 10-1305235 | B1 | 9/2013 |
| KR | 10-2014-0040134 | A | 4/2014 |

* cited by examiner

FIG. 4 null    bumpy    stripe    grainy    smooth    rough    grid

WEARABLE HAPTIC PATTERN DISPLAY DEVICE FOR BLIND PERSON

TECHNICAL FIELD

The present disclosure relates to a wearable haptic pattern display device for a blind person, and more particularly, to a wearable haptic pattern display device for a blind person, which has a compact size to make it easy for a user to carry the display device, includes a touch screen installed on the front surface of a main body thereof and having a touch panel and electro-sensitive panel integrated and coupled to each other in order to provide a text screen composed of various combinations of haptic textures through the touch screen, includes a ring-shaped wearing member installed on the rear surface of the main body thereof such that a user can conveniently read a text screen composed of haptic textures displayed on the touch screen using his thumb with the ring-shaped wearing member worn around his index finger, and thus read characters of news, books or messages using the display device regardless of time and location, includes an NFC (Near Field Communication) module installed in the main body thereof and configured to receive guide information from NFC tags installed at various places such as roads, intersections, stores or existing braille signs, such that blind users can effectively use the guide information.

BACKGROUND ART

Recently, various kinds of electronic and mobile electronic devices such as a computer, mobile communication terminal, PDA, and PMP are increasingly prevailed. The use of such electronic devices determines whether to be able to access digital information, and causes a new type of digital divide. Since typical electronic devices are designed for non-handicapped people who do not suffer from physical difficulties, it is not easy for handicapped people to access such an electronic device.

Therefore, various kinds of devices that can be used by handicapped people have been developed. In particular, various output devices for providing information to blind users through their sense of touch have been developed and commercialized.

For a conventional braille display device, it is important to develop a device configured to provide driving power required for a vertical movement to move braille pins upward and downward. Korean Patent Registration No. 1,181,811 discloses a braille display device using a braille output actuator, which performs a vertical movement required for moving a braille output pin upward and downward, and enables a user to read a braille character by sensing a braille output pin moved upward on a braille cell with his touch of sense through the base side of his finger.

However, when such an actuator is used, there is difficulty in miniaturizing and integrating solenoids as braille output element, which makes it difficult to reduce the size of the braille display device. In addition, since a high voltage is required to obtain sufficient driving power, electricity consumption is inevitably high. Thus, a user may have trouble in using the braille display device as a portable device.

Furthermore, since the braille display device using an actuator has low and irregular response speed, a user may have discomfort in using the braille display device.

With the recent development of IT technology, the text-voice conversion technology has been applied to terminal devices, such that blind people can easily acquire various pieces of information without using braille. However, the text-voice conversion devices may not support the voice function when a defect or error occurs in a sound providing module. Furthermore, when the contents written on a newspaper or book are delivered through voice, a user can simply receive information through the sense of hearing, but has difficulties in feeling that the user actively "reads" the information. Furthermore, the user cannot adjust a reading speed or range on his own, when reading the information.

DISCLOSURE

Technical Problem

Various embodiments are directed to a wearable haptic pattern display device for a blind person, which has a compact size to make it easy for a user to carry the display device, includes a touch screen installed on the front surface of a main body thereof and having a touch panel and electro-sensitive panel integrated and coupled to each other in order to provide a text screen composed of various combinations of haptic textures through the touch screen, includes a ring-shaped wearing member installed on the rear surface of the main body thereof such that a user can conveniently read a text screen composed of haptic textures displayed on the touch screen using his thumb with the ring-shaped wearing member worn around his index finger, and thus read characters of news, books or messages using the display device regardless of time and location, includes an NFC module installed in the main body thereof and configured to receive guide information from NFC tags installed at various places such as roads, intersections, stores or existing braille signs, such that blind users can effectively use the guide information.

Technical Solution

In an embodiment, there is provided a wearable haptic pattern display device for a blind person, which provides a text screen based on haptic patterns. The wearable haptic pattern display device may include: a main body; a touch screen installed on a front surface of the main body, including a touch panel for sensing a touch location of a user and an electro-sensitive panel for delivering an electrical stimulation to a contacted body part, and configured to provide different haptic textures through different electrical stimulations to represent a character with a combination of haptic textures, wherein the touch panel and the electro-sensitive panel are integrated and coupled to each other; a control unit configured to provide a text screen composed of haptic patterns through the touch screen, and deliver a haptic texture corresponding to the user's touch location to the user's body part contacted with the touch screen; and a wearing member installed on a rear surface of the main body and formed in a ring shape so as to be worn around the user's finger. While scanning the text screen composed of haptic patterns on the touch screen using the body part, the user may recognize a character represented on the touch screen through an electrical stimulation of a specific haptic texture delivered to the body part.

Advantageous Effects

According to the embodiment of the present invention, the wearable haptic pattern display device for a blind person may include the touch screen installed on the front surface of the main body and configured to provide a text screen composed of various combinations of haptic textures, and include the ring-shaped wearing member installed on the rear surface of the main body thereof such that a user can conveniently read a text screen composed of haptic textures displayed on the touch screen using his thumb with the ring-shaped wearing member worn around his index finger. Therefore, the user can read characters of news, books or messages using the display device regardless of time and location.

Furthermore, the display device may include the NFC module installed in the main body thereof and configured to receive guide information from NFC tags installed at various places such as roads, intersections, stores or existing braille signs. Thus, blind users can effectively use the guide information.

Moreover, during the process of reading a text screen composed of various combinations of haptic textures, the display device can provide a function of stopping or starting the text screen through the manipulation button part installed in the main body or a function of skipping or returning a word or sentence read from the text screen, such that the user can conveniently use the display device.

MODE FOR INVENTION

Hereafter, exemplary embodiments of the present invention will be described in detail with reference to the accompanying drawings, but the present invention is not limited to the embodiments.

Figure 1:
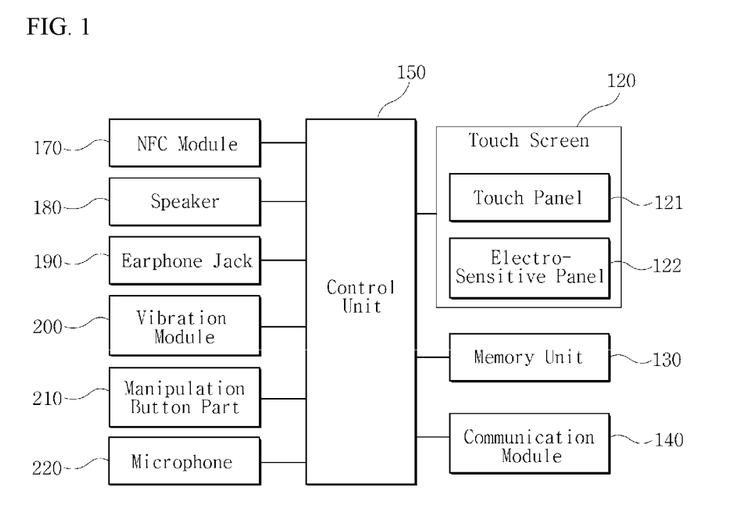
FIG. 1 is a block diagram illustrating a wearable haptic pattern display device for a blind person according to an embodiment of the present invention.
Figure 2:
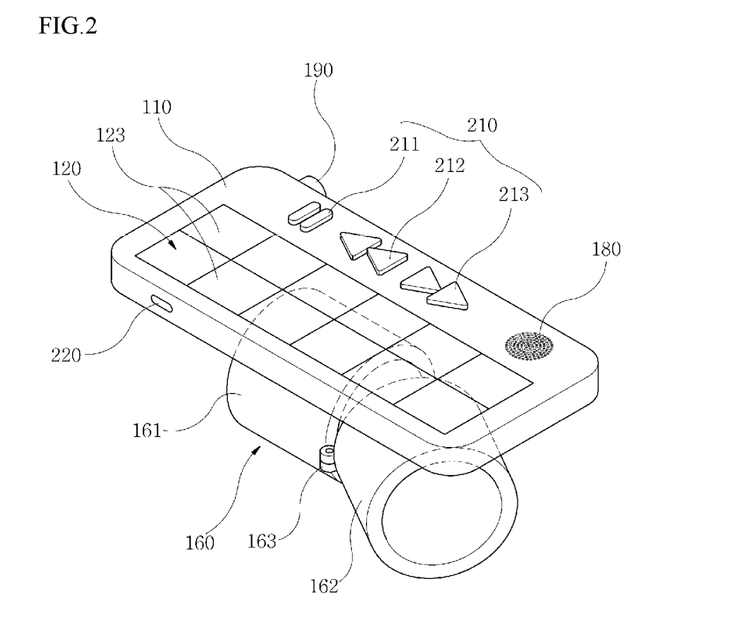
FIG. 2 illustrates the external structure of the wearable haptic pattern display device for a blind person according to the embodiment of the present invention.
Figure 3:
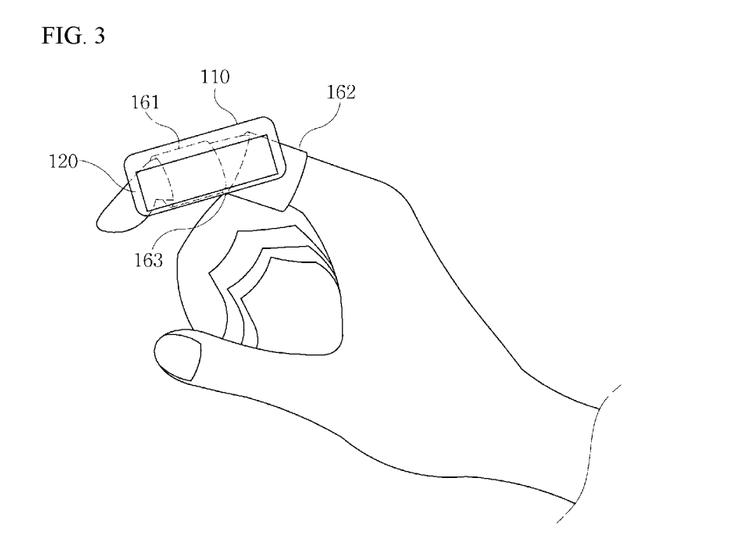
FIG. 3 illustrates that the wearable haptic pattern display device according to the embodiment of the present invention is worn around his finger.

FIG. 1 is a block diagram illustrating a wearable haptic pattern display device for a blind person according to an embodiment of the present invention, FIG. 2 illustrates the external structure of the wearable haptic pattern display device for a blind person according to the embodiment of the present invention, and FIG. 3 illustrates that the wearable haptic pattern display device according to the embodiment of the present invention is worn around his finger.

As illustrated in FIGS. 1 to 3, the wearable haptic pattern display device for a blind person according to an embodiment of the present invention includes a main body 110; a touch screen 120 installed on the front surface of the main body 110, and including a touch panel 121 configured to sense a touch location of a user and an electro-sensitive panel 122 configured to deliver an electrical stimulation to a contacted body part, wherein the touch panel 121 and the electro-sensitive panel 122 are integrated and coupled to each other; a memory unit 130 configured to store various data and electronic files; a communication module 140 configured to transmit/receive data through communication with the outside; a control unit 150 configured to control operations of the respective units, provide a text screen composed of haptic patterns through the touch screen 120, and control the touch screen 120 to deliver an electrical stimulation corresponding to a touch location of the user to a body part of the user, which is contacted with the touch screen 120; and a wearing member 160 installed on the rear surface of the main body 110 and formed in a ring shape so as to be worn around a finger of the user.

That is, the wearable haptic pattern display device for a blind person according to the embodiment of the present invention includes the touch screen installed on the front surface of the main body of the display device and having the touch panel and the electro-sensitive panel which are integrated and coupled to each other, provides a text screen composed of various haptic textures through the touch screen, and includes the ring-shaped wearing member installed on the rear surface of the display device such that the user can wear the display device around his finger. Thus, the user can conveniently read a haptic-texture text screen displayed on the touch screen using his thumb, with the ring-shaped wearing member worn around his index finger. Therefore, the user can read characters such as news, book or message using the display device, regardless of time and location.

Hereafter, the components of the wearable haptic pattern display device for a blind person according to the embodiment of the present invention will be described in detail.

The main body 110 may form the exterior of the display device, and have a compact size such that a user can wear the display device around his finger through the wearing member 160 installed on the main body 110.

The touch screen 120 is installed on the front surface of the main body 110, and includes the touch panel 121 and the electro-sensitive panel 122. The touch panel 121 provides a screen and senses a touch location of the user, and the electro-sensitive panel 122 is installed on the touch panel 121 so as to generate an electrical signal.

The touch panel 121 serves to sense a touch location of the user. The touch panel 121 may include various types of touch panels such as a capacitive touch panel, infrared touch panel, resistive touch panel and ultrasonic touch panel. When the touch panel 121 is touched by a body part such as a finger of the user, the touch panel 121 senses the touch and determines a touch location of the user.

The electro-sensitive panel 122 includes conductive electrodes having an insulator formed thereon, and is closely attached on the top of the touch panel 121. When a touch of the user's finger on the panel surface is sensed by the touch panel 121, the electro-sensitive panel 122 delivers an electrical stimulation corresponding to the touch to the user's finger, depending on the location of the user's touch.

That is, the electro-sensitive panel 122 generates an electrical signal depending on the touch location on the panel surface, and provides a predetermined electrical stimulation pattern to the contacted body part of the user.

At this time, the generated electrical stimulation pattern can be modified in various manners by changing the characteristic factors of the electrical signal, such as a frequency, amplitude, waveform, duration and pause time. Since the user can feel various haptic senses such as a rough sense and smooth sense through his finger depending on the generated electrical stimulation pattern, the electro-sensitive panel 122 can implement various haptic patterns.

Figure 4:
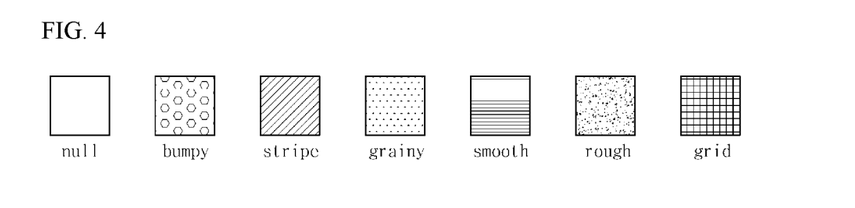
FIG. 4 illustrates haptic patterns applied to the haptic pattern display device according to the embodiment of the present invention.

FIG. 4 illustrates haptic patterns applied to the haptic pattern display device according to the embodiment of the present invention.

The touch screen 120 configured in the above-described manner provides a haptic pattern to each unit cell on a screen provided through the touch panel 121. For example, as illustrated in FIG. 4, different haptic textures may be provided to unit cells, the haptic textures including a bumpy texture, stripe texture, grainy texture, smooth texture, rough texture, grid texture and null texture.

Furthermore, various characters can be represented by a combination of haptic textures provided to unit cells 123 through the touch screen 120.

Figure 5:
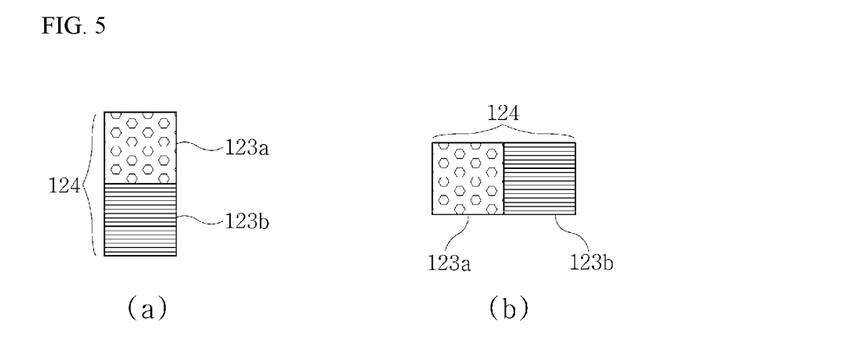
FIGS. 5A and 5B illustrate a character representation process using various combinations of haptic textures provided through a touch screen.

FIGS. 5A and 5B illustrate a character representation process using a combination of haptic textures provided through the touch screen.

As illustrated in FIGS. 5A and 5B, the haptic pattern display device configures a plurality of character cells 124 each having a pair of unit cells 123a and 123b adjacent in the top-to-bottom or side-to-side direction, such that the unit cells 123a and 123b can provide different haptic textures through different electrical stimulation patterns. Through various combinations of haptic textures provided from the pair of unit cells 123a and 123b , one character cell 124 can represent various character symbols such as one Korean letter, English letter, number and special character. When various pieces of text information are provided through the combinations, the user can recognize the contents recorded on the touch screen 120 by recognizing haptic patterns delivered to his finger while scanning the touch screen 120 with the finger.

For example, when a user scans the character cell 124 having the pair of unit cells 123a and 123b in FIG. 5A or 5B with his finger, an electrical stimulation corresponding to a haptic pattern allocated to the character cell 124 is delivered to the finger. Then, the user can recognize the character cell 124 displayed on the touch screen 120 touched by his finger, the character cell 124 being composed of 'bumpy texture' and 'smooth texture'. At this time, when it was promised that the character cell 124 in which 'bumpy texture' and 'smooth texture' are sequentially connected would indicate 'ㅁ (Korean letter)', the user can read the Korean letter 'ㅂ' through the scanning process.

The method for reading a character through a haptic pattern will be described in more detail with reference to FIGS. 6 to 8.

Referring back to FIG. 1, the memory unit 130 may store text combination system recognition information on a haptic pattern screen provided through the touch screen 120, and an electrical signal generation program (software) configured to generate an electrical signal for providing an electrical stimulation of a haptic texture corresponding to each unit cell according to the text combination system recognition information. In addition, the memory unit 130 may store information of the display device, information of the user using the display device, and/or various electronic files including an electronic file converted into haptic patterns.

The communication module 140 serves to transmit/receive data through communication with the outside. The communication module 140 may receive various contents including an electronic file converted into a haptic pattern through connection with a communication network such as the Internet.

The communication module 140 may include communication modules using Wi-Fi (Wireless Fidelity) and/or other various wireless communication schemes. At this time, when the WiFi communication is used, the communication module 140 can communicate with outside without a separate communication fee.

The control unit 150 controls the operations of the respective units constituting the display device, and enables a user to read an electronic file converted into a haptic pattern.

That is, the control unit 150 converts an electronic file stored in the memory unit 130 or an electronic file received through the communication module 140 according to the haptic pattern system information stored in the memory unit 130, provides the converted electronic file to the user through the touch screen 120, senses a touch location through the touch panel 121 of the touch screen 120, generates an electrical signal corresponding to the touch location, and provides an electrical stimulation of the corresponding pattern to the user's body part (finger) contacted through the electro-sensitive panel.

At this time, when an electronic file composed of haptic patterns is previously stored in the memory unit 130 or has been already received through the network, the control unit 150 may display a screen according to the haptic patterns contained in the electronic file, and provide an electrical stimulation of haptic textures corresponding to the haptic patterns.

The control unit 150 may be configured to interwork with a mobile communication terminal such as a smart phone through wired/wireless communications using the communication module 140. In this case, the control unit 150 may receive a command signal or data from the mobile communication terminal through the communication module 140 and display the command signal or data as haptic patterns through the touch screen 120, or transmit a command signal or data to the mobile communication terminal through the communication module 140 according to the user's manipulation.

The display device configured in the above-described manner includes the wearing member 160 which can be worn around a finger of the user to use the display device.

The wearing member 160 is installed on the rear surface of the main body 110, and formed in a ring shape so as to be worn around the user's finger. The user can conveniently read haptic patterns displayed on the touch screen 120 using his thumb, with the display device worn around his index finger.

In the embodiment illustrated in FIGS. 2 and 3, the wearing member 160 has a double ring structure to more reliably fix the display device to a user's finger. Therefore, when the wearing member 160 with a double ring structure is worn around the finger, the display device may not be turned or separated from the finger but reliably fixed on the finger, even though the user freely moves the finger around which the display device is worn The wearing member 160 may include a first wearing ring 161 fixed to the rear surface of the main body 110 and a second wearing ring 162 disposed at one side of the first wearing ring 161 so as to communicate with the first wearing ring 161. The second wearing ring 162 may be turnably coupled to one edge of the first wearing ring 161 through a hinge 163.

Therefore, in order to wear the display device around the finger as illustrated in FIG. 3, the user sequentially inserts his index finger into the second wearing ring 162 and the first wearing ring 161 such that the second wearing ring 162 is worn around the third joint of the index finger and the first wearing ring 161 formed on the display device is worn around the second joint of the index finger. At this time, the hinge 163 connecting the first and second wearing rings 161 and 162 may be disposed between the second and third joints of the index finger, such that the user can freely bend the index finger with the display device worn around the index finger.

The first wearing ring 161 serves to fix the display device to the second joint of the index finger, and the second wearing ring 162 serves to hold the first wearing ring 161 fixed to the display device such that the display device is not turned around or separated from the index finger while the user uses the display device.

In other words, while the user touches the touch screen 120 of the display device using his thumb with the display device worn around his index finger, the first wearing ring 161 fixed to the display device may be turned around the index finger by a pressing force of the thumb. At this time, the second wearing ring 162 coupled to the first wearing ring 161 through the hinge 163 can prevent the turn of the first wearing ring 161, thereby increasing the convenience of use.

Therefore, since the user can use the display device with the display device worn around his finger, the user can use the display device regardless of time and location. Furthermore, since the user can freely bend the finger with the display device worn around the finger, the user can freely move the hand with the display device worn around the finger.

In the present embodiment, the wearing member installed on the display device has a double ring structure so as to be more reliably fixed to the finger. However, the present invention is not limited thereto. When the wearing member is formed in a ring shape and made of rubber or synthetic resin with favorable elasticity and adhesion, the display device can be reliably fixed to a user's finger through a single ring structure. Furthermore, the wearing member can be modified in various manners.

The wearable haptic pattern display device for a blind person according to the embodiment of the present invention may have various functions for convenience of a blind user.

As illustrated in FIGS. 1 and 2, the display device may include an NFC (Near Field Communication) module 170, a speaker 180, an earphone jack 190, a vibration module 200, a manipulation button part 210 and a microphone 220. The NFC module 170 is installed at one side of the main body 110 so as to recognize an NFC tag, the speaker 180 outputs sound and voice information, the earphone jack 190 is installed at one side of the main body 110 such that an earphone is coupled to the earphone jack 190, the vibration module 200 is installed in the main body 110 and provides a vibration alarm function, a manipulation button part 210 is installed at one side of the front surface of the main body 110 and provides a function of stopping and starting a text screen composed of haptic patterns displayed on the touch screen 120 and a function of returning and skipping a word/sentence, and the microphone 220 is installed in the main body 110 so as to record sound and voice.

The NFC module 170 is installed at one side of the main body 110 of the display device. When a user wearing the display device approaches a location at which an NFC tag is installed, the NFC module 170 may receive information provided through the NFC tag. At this time, according to control of the control unit 150 for controlling the display device, the information provided from the NFC tag may be outputted through the speaker 180 installed in the display device or the user's earphone connected to the earphone jack 190. Furthermore, the information provided from the NFC tag may also be provided as a text screen composed of haptic patterns through the touch screen 120.

Recently, with the increase of services using NFC tags, information is provided through NFC tags at various places. Thus, the user may receive various pieces of guide information using the NFC module 170 installed in the display device.

For example, when the user is moving on the road, the NFC module 170 of the display device may automatically recognize NFC tags attached on street lamps or other road facilities, and inform the user of the current location. Furthermore, even when the user uses a convenience store or mart, the NFC module 170 may automatically recognize NFC tags installed in corners of the store and inform the user of the current location. Furthermore, the NFC module 170 may recognize NFC tags attached to products, respectively, and inform the user what the products are.

Moreover, when a blind person does not normally find the locations of braille signs which are applied to an elevator, a banister and the like, the blind person may not read the braille signs, but miss the braille signs. However, when NFC tags are attached to the braille signs, the blind person can effectively receive necessary guide information through the NFC module 170 installed in the display device.

The vibration module 200 installed in the display device provides an alarm function of vibrating the display device to inform the user that the NFC module 170 of the display device has recognized an NFC tag or new information has been transmitted to the display device through the communication module 140.

At this time, according to the user's selection, the alarm function may be provided as vibration of the display device through the vibration module 200, provided as sound through the speaker 180, or provided as both of vibration and sound.

The manipulation button part 210 installed on the front surface of the display device provides a function of stopping a text screen composed of haptic patterns displayed on the touch screen 120 or starting a stopped text screen and a function of returning or skipping a word/sentence during a process of reading a text screen.

The manipulation button part 210 may have a physical button structure such that the user can recognize and press a plurality of buttons 211, 212 and 213 constituting the manipulation button part 210 through the sense of touch using a finger.

In the present embodiment, the manipulation button part 210 includes the stop/start button 211, the return button 212 and the skip button 213, as illustrated in FIG. 2.

At this time, the stop/start button 211, the return button 212 and the skip button 213 may be formed in a protruding shape, such that the user can recognize the buttons and the shapes of the buttons through the sense of touch using the finger.

The stop/start button 211 provides a function of stopping or restarting a text screen displayed on the touch screen 120.

In other words, when the user presses the stop/start button 211 while reading a text screen composed of haptic patterns with his finger through the touch screen 120, the haptic function and the text screen displayed on the touch screen 120 are stopped. When the user presses the stop/start button 211 again, the text screen displayed on the touch screen 120 is reactivated, and the user can read the text screen which the user finally read.

The stop/start button 211 may be effectively used when the user needs to handle other works in the middle of reading text characters through the touch screen 120.

The return button 212 provides a function of returning a word or sentence which had been read during the text screen reading process through the touch screen 120.

In other words, when the user presses the return button once for a short time while reading a text screen composed of haptic patterns using the finger through the touch screen 120, the text screen for the currently read word may be returned to the text screen for the start character of the previous word. In this way, the user can return the text screen to a text screen for a previous word corresponding to the number of times that the return button 212 is pressed. Therefore, the user can read a text screen from a desired word location.

Furthermore, when the user presses the return button 212 once for a long time, the text screen for the currently read sentence may be returned to a text screen for the start character of the previous sentence. Thus, the user can read the previous sentence.

The skip button 213 provides a function of skipping the next word or sentence during the text screen reading process through the touch screen 120.

In this case, when the user presses the skip button 213 once for a short time in the middle of reading a text screen composed of haptic patterns with his finger through the touch screen 120, the user may skip from the text screen for the currently read word to the text screen for the start character of the next word. Furthermore, when the user presses the skip button 213 once for a long time, the user may skip from the text screen for the currently read sentence to the text screen for the start character of the next sentence.

In the present embodiment, the manipulation button part 210 includes the stop/start button 211, the return button 212 and the skip button 213. However, various function buttons for selecting or executing a text file composed of haptic patterns may be installed in addition to the above-described buttons.

The display device configured in the above-described manner may have a recording function of recording sound and voice.

That is, since the microphone 220 for receiving sound and voice is installed in the main body 110, the control unit 150 may record the voice or sound inputted to the microphone 220 or transmit the recorded data to a mobile communication terminal carried by the user through the communication module 140 such that the data can be stored in the mobile communication terminal. If necessary, the user may input a control command as voice through the microphone 220, in order to control the operation of the display device.

Hereafter, a character reading process using the wearable haptic pattern display device for a blind person according to the embodiment of the present invention will be described.

Figure 6:
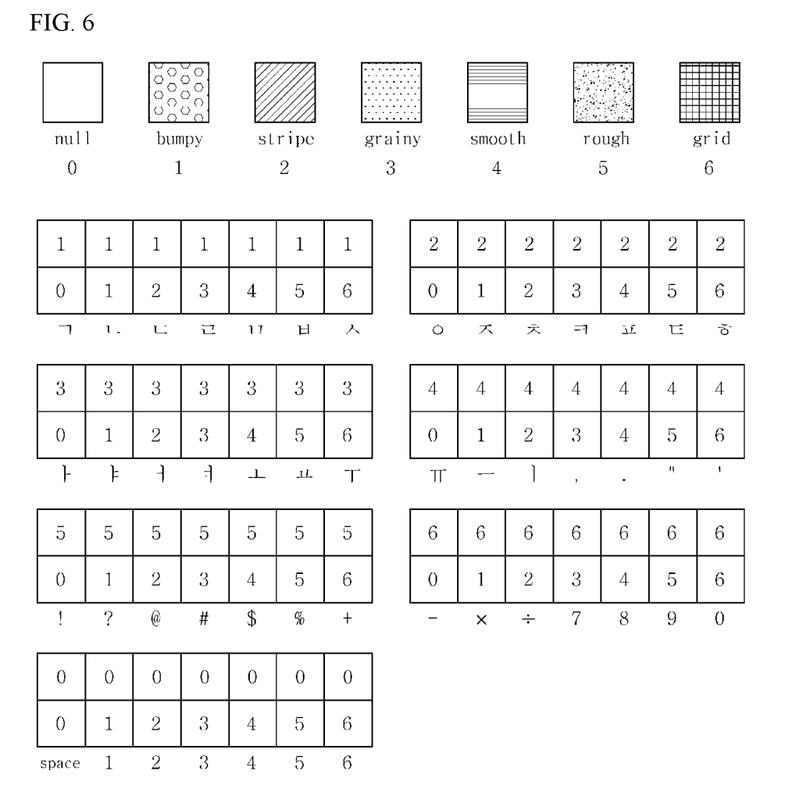
FIG. 6 illustrates an example of a text combination system for a haptic pattern screen which represents Korean letters, numbers and special characters using a plurality of unit cell combinations.
Figure 7:
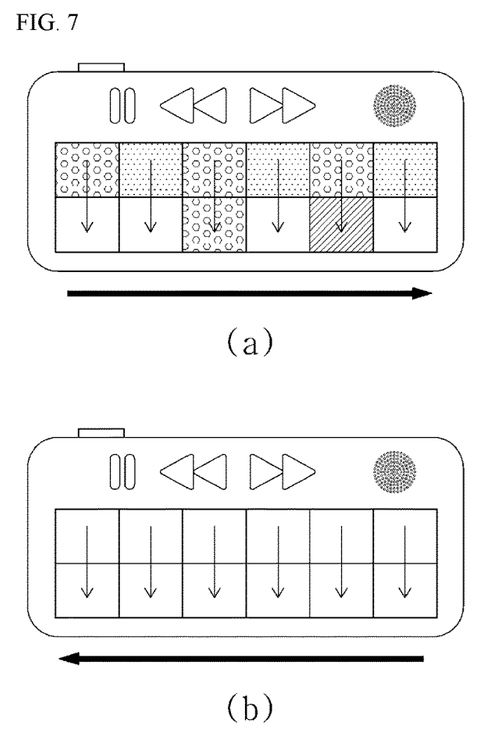
FIG. 7 illustrates a process of reading a character using the wearable haptic pattern display device for a blind person according to the embodiment of the present invention.
Figure 8:
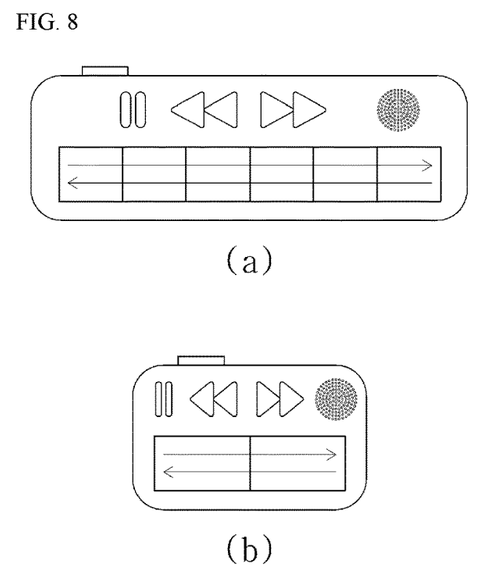
FIGS. 8A and 8B illustrate various examples of a structure in which unit cells of the touch screen are formed in a line.

FIG. 6 illustrates an example of a text combination system for a haptic pattern screen which represents Korean letters, numbers and special characters using a plurality of unit cell combinations, and FIG. 7 illustrates a process of reading a character using the wearable haptic pattern display device for a blind person according to the embodiment of the present invention.

For example, FIG. 6 illustrates the text combination system for a haptic pattern screen, which forms 49 pairs of unit cell combinations using haptic patterns having different textures 0 to 6, and represents Korean letters, numbers and special characters using the unit cell combinations. When it is assumed that a text "가나다" is displayed on the touch screen as illustrated in FIG. 7A, the user sequentially scans the corresponding character cells in the arrow direction with his finger. At this time, each of the unit cells delivers an electrical stimulation to the contacted finger of the user, the electrical stimulation corresponding to haptic textures allocated to the unit cell.

At this time, the touch screen according to the present embodiment has a structure in which the unit cells are arranged in two lines, and represents a character symbol through a pair of unit cells adjacent to each other in the top-to-bottom direction. Therefore, the user can feel 'bumpy' texture at the top and 'null' texture at the bottom in the first character cell at the left top of FIG. 7, and thus recognize a Korean letter of 'ㄱ'. Then, the user can sequentially scan the following character cells in the same manner, and read the text "가나다" displayed on the touch screen through electrical stimulations delivered to the contacted finger for the respective character cells.

During the text screen reading process, when the text from the left character cell to the right character cell on the touch screen is completely read as illustrated in FIG. 7A, the next text composed of haptic patterns is displayed from the right character cell to the left character cell on the touch screen by the control unit of the display device, as illustrated in FIG. 7B. Thus, the user can read the next text by sequentially scanning the character cells in the return direction, that is, from the right character cell to the left character cell with his finger. In this way, the user can continuously read texts by repeatedly scanning the character cells from the left to the right and from the right to the left with his finger.

When such a text reading method is used, the user can read texts through the process of continuously scanning the touch screen in the side-to-side direction with his finger. Therefore, the text reading speed can be raised, and the fatigue of the finger can be reduced, which makes it possible to further increase the convenience of use.

In the present embodiment, in order to increase the convenience of the text reading process, the display device provides a text screen composed of character cells such that the user can repeatedly scan the text screen of the touch screen in the side-to-side direction. However, the present invention is not limited thereto, but the display device can display character cells on the touch screen only in one direction from the left to the right, and thus provide a text screen on which characters are arranged in a typical reading direction from the left to the right.

Moreover, the display device according to the present embodiment displays character cells on the touch screen having unit cells arranged in two lines, the character cells each having a pair of unit cells adjacent to each other in the top-to-bottom direction, such that the user can read the character cells. However, the display device may sequentially display character cells in the upper and lower lines on the touch screen, the character cells each having a pair of unit cells adjacent to each other in the side-to-side direction, such that the user can read the character cells.

Furthermore, the haptic pattern display device according to the present embodiment may include unit cells formed in a line on the touch screen. In this case, character cells each having a pair of unit cells adjacent to each other in the side-to-side direction may be displayed on the touch screen.

FIGS. 8A and 8B illustrate various examples of a structure in which unit cells of the touch screen are formed in a line.

When the display device has a structure in which six unit cells are arranged in a line on the touch screen as illustrated in FIG. 8A, three character cells each having a pair of unit cells adjacent to each other in the side-to-side direction can be displayed on the touch screen. In this case, when a text from the left character cell to the right character cell on the touch screen is completely read, the next text composed of haptic patterns may be displayed from the right character cell to the left character cell. Thus, the user can read the texts through a process of consecutively scanning the touch screen in the side-to-side direction with his finger, which makes it possible for the user to read the texts more conveniently.

The display device may include only two unit cells on the touch screen, in order to further reduce the size of the display device.

That is, when the display device has a structure in which two unit cells are formed on the touch screen as illustrated in FIG. 8B, the display device can display one character cell having a pair of left and right unit cells. Thus, the user can sufficiently read a text through the touch screen. At this time, the user can also read the text through the process of consecutively scanning the touch screen in the side-to-side direction with his finger.

During such a character reading process using the wearable haptic pattern display device for a blind person, the user can consecutively scan the touch screen in the side-to-side direction using his thumb, with the display device worn around high index finger. Thus, even when the user reads a long sentence, the user can conveniently use the display device without fatigue.

The haptic pattern display device according to the present embodiment can not only display character symbols through character cells each having a pair of unit cells on the touch screen, but also display braille letters on the touch screen in the same manner as the conventional six-dot braille system.

The present applicant has already filed a display device and a braille reading method, which provide the conventional six-dot braille system through electrical stimulations, and the display device and the braille reading method were registered as Korean Patent Registration No. 1,305,236. The haptic pattern display device according to the present embodiment can also display patterns of the conventional six-dot braille system on the touch screen, such that a user can recognize the patterns through electrical stimulations.

Figure 9:
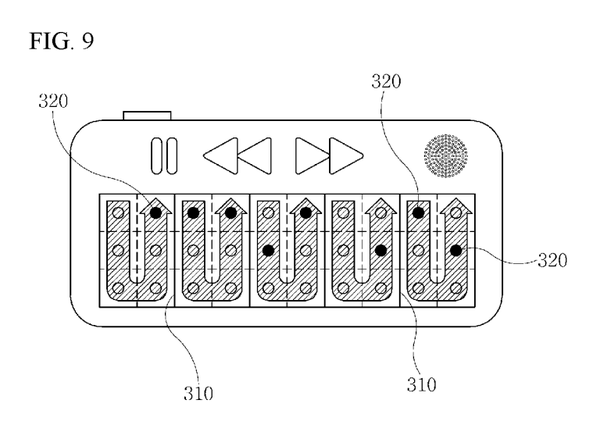
FIG. 9 illustrates a process of displaying six-dot braille patterns on the wearable haptic pattern display device according to the embodiment of the present invention.

FIG. 9 illustrates a process of displaying six-dot braille patterns on the wearable haptic pattern display device according to the embodiment of the present invention.

As illustrated in FIG. 9, the haptic pattern display device displays a plurality of dot cells 310 indicated by a solid line on the touch screen, in order to distinguish regions in which braille letters are printed during a process of displaying the braille letters according to the conventional six-dot braille system. Thus, the braille letters allocated to the respective dot cells are displayed according to the conventional six-dot braille system.

Therefore, as illustrated in FIG. 9, the user sequentially scans each of the dot cells in the U-shape from the left top to the right top with his finger. At this time, the display device delivers an electrical stimulation to the user's finger contacted with a region in which dots 320 are printed according to the six-dot patterns. Thus, the user can recognize the locations of the electrical stimulations delivered to his finger during the scanning process, and recognize the braille character displayed on the screen.

The method for providing electrical stimulations based on braille system recognition information has a relatively complex scanning process. However, the method applies the same recognition function as the conventional six-dot braille system for a blind person, such that a blind person can be easily accustomed to recognizing braille letters.

As described above, the wearable haptic pattern display device for a blind person according to the embodiment of the present invention may include the touch screen which is installed on the front surface of the main body and can provide a text screen composed of various combinations of haptic textures, and the ring-shaped wearing member which is installed on the rear surface of the main body and can be worn around a user's finger. Thus, the user can conveniently read a text screen composed of haptic textures displayed on the touch screen using his thumb, with the ring-shaped wearing member worn around his index finger. Therefore, the user can read characters of news, books or messages using the display device, regardless of time and location.

Furthermore, the display device may include the NFC module installed in the main body, in order to receive guide information from NFC tags installed in various places such as roads, intersections, stores or braille signs. Thus, a blind person can effectively use the display device.

Moreover, during the process of reading a text screen composed of combinations of haptic textures, the display device provides the function of stopping or starting a text screen through the manipulation button part installed in the main body of the display device, or skipping or returning a word or sentence read from the text screen. Thus, the user can use the display device more conveniently.

While various embodiments have been described above, it will be understood to those skilled in the art that the embodiments described are by way of example only. Accordingly, the disclosure described herein should not be limited based on the described embodiments.

INDUSTRIAL APPLICABILITY

The wearable haptic pattern display device for a blind person according to the embodiment of the present invention can provide a text screen composed of various combinations of haptic textures, such that a user can conveniently read the text screen of haptic textures displayed on the touch screen with his finger. Therefore, blind users can effectively read characters of news, books or messages through the display device. Furthermore, the display device includes the NFC module installed therein, in order to receive guide information from NFC tags installed at various places such as roads, intersections, stores or braille signs. Thus, blind users can effectively use the guide information.

The invention claimed is:

1. A wearable haptic pattern display device for a blind person, which provides a text screen based on haptic patterns, the wearable haptic pattern display device comprising:
   a main body;
   a touch screen installed on the main body, including a touch panel for sensing a touch location of a user and an electro-sensitive panel for delivering an electrical stimulation to the touch location of the user, and configured to provide different haptic textures through different electrical stimulations to represent a character with a combination of haptic textures, wherein the touch panel and the electro-sensitive panel are integrated and coupled to each other;
   a control unit configured to provide a text screen composed of haptic patterns through the touch screen, and deliver a haptic texture corresponding to the user's touch location to the user's touch location contacted with the touch screen; and a wearing member installed on the main body and formed so as to be worn around the user's finger, wherein the wearing member comprises:

a first wearing ring fixed to the main body; and a second wearing ring disposed at one side of the first wearing ring so as to pivot relative to the first wearing ring, wherein the user wears the first and second wearing rings around the joints of his finger, such that the display device is fixed to the finger, wherein while scanning the text screen composed of haptic patterns on the touch screen using the user's touch location, the user recognizes a character represented on the touch screen through an electrical stimulation of a specific haptic texture delivered to the user's touch location.

2. The wearable haptic pattern display device of claim 1, wherein the main body comprises an NFC (Near Field Communication) module for recognizing an NFC tag.

3. The wearable haptic pattern display device of claim 1, wherein the main body comprises:

a speaker for outputting sound and voice information; and an earphone jack for connection with an earphone.

4. The wearable haptic pattern display device of claim 1, wherein the main body comprises a vibration module for providing a vibration alarm function.

5. The wearable haptic pattern display device of claim 1, wherein the main body comprises a manipulation button part installed on the front surface thereof, and configured to control a display function for a text screen displayed on the touch screen.

6. The wearable haptic pattern display device of claim 5, wherein the button manipulation part is formed in such a shape that the user can identify buttons of the button manipulation part through the sense of touch.

7. The wearable haptic pattern display device of claim 6, wherein the button manipulation part comprises:

a stop/start button configured to provide a function of stopping or restarting a text screen displayed on the touch screen;

a return button configured to provide a function of returning a word or sentence which was read during a text screen reading process through the touch screen; and a skip button configured to provide a function of skipping the next word or sentence during the text screen reading process through the touch screen.

8. The wearable haptic pattern display device of claim 1, wherein the main body comprises a microphone for recording voice and sound.

9. The wearable haptic pattern display device of claim 1, further comprising a memory unit configured to store text combination system recognition information on a haptic pattern screen provided through the touch screen, an electrical signal generation program to generate an electrical signal for providing an electrical stimulation of a haptic texture corresponding to each unit cell according to the text combination system recognition information, and/or an electronic file converted into haptic patterns.

10. The wearable haptic pattern display device of claim 1, further comprising a communication module configured to transmit/receive data through communication with the outside.

11. The wearable haptic pattern display device of claim 10, wherein the communication module has a Wi-Fi (Wireless Fidelity) communication function.

12. The wearable haptic pattern display device of claim 10, wherein the control unit is configured to interwork with a mobile communication terminal of the user, by transmitting/receiving a command signal or data to/from the mobile communication terminal of the user through the communication module.

13. The wearable haptic pattern display device of claim 1, wherein the touch screen is configured to display one or more character cells each having a pair of unit cells providing independent haptic textures and arranged adjacent to each other.

14. The wearable haptic pattern display device of claim 13, wherein the character cell is configured to represent a character symbol including one Korean letter, alphabet, number or special character through a combination of haptic textures which are independently provided from the pair of unit cells.

15. The wearable haptic pattern display device of claim 13, wherein the pair of unit cells constituting the character cell are arranged adjacent to each other in the side-to-side direction or top-to-bottom direction.

16. The wearable haptic pattern display device of claim 13, wherein the one or more character cells are arranged in a line and displayed on the touch screen.

17. The wearable haptic pattern display device of claim 16, wherein when the character cells arranged in a line are scanned through the touch location of the user, the touch screen continuously displays text information following the scanned character cells.

18. The wearable haptic pattern display device of claim 17, wherein the text information is displayed in the reverse direction to the display direction of the scanned character cells.

19. The wearable haptic pattern display device of claim 1, wherein the touch screen displays a plurality of character cells which are sequentially arranged to provide independent haptic textures, and each of the character cells represents a character symbol by selectively providing an electrical stimulation only in a region where dots are printed according to a general-purpose multi-dot braille system for a blind person.

* * * * *